United States Patent Office 2,763,685
Patented Sept. 18, 1956

2,763,685

PRODUCTION OF AMIDE INTERMEDIATES

Lorraine Guy Donaruma, Woodbury, N. J., assignor to E. I. du Pont de Nemours and Company, Wilmington, Del., a corporation of Delaware No Drawing. Application June 30, 1955,
Serial No. 519,240

12 Claims. (Cl. 260—566)

The present invention relates to a process for the production of amide intermediates and, more particularly, to a process for the production of ketoximes and ketoxime O-alkyl ethers.

Ketoximes, particularly cycloalkanone oximes, have long been used as intermediates in the production of amides and cyclic amides (lactams). For example, cyclohexanone oxime, the most important member of this class, has served as an intermediate in the production of caprolactam which generally is produced by Beckmann rearrangement of the cyclohexanone oxime, and many modifications and improvements in this process are known. The O-alkyl ethers of ketoximes are also known to undergo rearrangement to yield amides. Heretofore, the production of these amide intermediates has generally been effected by processes wherein ketones or secondary nitro compounds or their salts are treated with hydroxylamine salts and the like. Other known methods of producing the amide intermediates from nitro compounds and their salts include treatments, e. g., with amides, ammonia, sulfides, olefins, hydrogen, and the like. However, many of these processes are commercially unattractive because of the high cost and/or precarious supply of reagents, poor yields, contamination of the desired products, etc. Hence, although many of the prior processes produce satisfactory amide intermediates, the need has long existed for a simple process whereby the amide intermediates could be produced efficiently with the use of relatively inexpensive, readily available materials.

Accordingly, an object of the present invention is to provide an improved process for the production of amide precursors. Another object of the present invention is to provide an efficient process for the production of ketoximes and ketoxime O-alkyl ethers. A still further object of the present invention is to provide a process for the conversion 1 of salts of nitro compounds to useful amide precursors. Other objects will become apparent as the invention is further described.

I have found that the foregoing objects may be achieved when I react a salt of a secondary nitro compound and a tertiary oxonium salt.

In accordance with the process of the present invention, a tertiary oxonium salt $R_3OX$, wherein R is an alkyl radical, e. g., methyl or ethyl, and X is a monovalent anion, e. g., $BF_4$, $AlCl_4$, or $FeCl_4$, is added to an aqueous solution of a salt, for instance, an alkali metal salt, of a secondary nitro alkane, e. g., 2-nitropropane, or of a nitro cycloalkane, e. g., nitrocyclohexane or nitrocyclopentane.

The following examples illustrate specific embodiments of the method of carrying out the process of the present invention. However, the examples should not be construed to limit the invention in any manner. The parts given in the examples are parts by weight. In each case, the conversions reported are based on the quantity of nitro compound charged.

*Example 1*

Nitrocyclohexane (26 parts) was dissolved in 100 parts of water containing 8 parts of sodium hydroxide. Solid triethyloxonium fluoborate, $(C_2H_5)_3OBF_4$, then was added portionwise in the amount of 38 parts to this solution which was maintained at 50–60° C. (1 to 1 oxonium salt to nitrocyclohexane mole ratio). When the addition had been completed, the mixture was stirred for about thirty minutes at the reaction temperature. The reaction mixture then was cooled, saturated with sodium chloride, and extracted with ether. The extract was dried, the ether was removed from the dry extract by distillation, and the residue was distilled to give 16.7 parts (74% conversion) of cyclohexanone oxime and 5.4 parts (19% conversion) of cyclohexanone oxime O-ethyl ether. This corresponded to a total conversion to amide-forming intermediates of 93%.

*Example 2*

The procedure of Example 1 was employed in the following runs.

| Run | Reacatans (parts) | | | | Temp. (° C.) | Conversion to— | | | | Total Conversion to Amide Intermediates, percent |
|---|---|---|---|---|---|---|---|---|---|---|
| | | | | | | Cyclohexanone Oxime | | Cyclohexanone Oxime O-Ethyl Ether | | |
| | NCH* | NaOH | $(C_2H_5)_3OBF_4$ | $H_2O$ | | parts | percent | parts | percent | |
| A | 26 | 8 | 38 | 100 | 80–100 | 11.6 | 51 | 5.4 | 18 | 69 |
| B | 26 | 8 | 38 | 100 | 25–30 | 11.7 | 52 | 1.9 | 7 | 59 |

*NCH=Nitrocyclohexane.

*Example 3*

The procedure of Example 1 again was employed in the following run except that the triethyloxonium fluoborate was replaced by trimethyloxonium fluoborate. The reactants were used in the following quantities (parts): nitrocyclohexane, 26; sodium hydroxide, 8; trimethyloxonium fluoborate, 32; and water, 50 (1 to 1 oxonium salt to nitrocyclohexane mole ratio). Cyclohexanone oxime was obtained in the amount of 15 parts (66% conversion) and cyclohexanone oxime O-methyl ether in the amount of 3.4 parts (13% conversion). The total conversion to amide intermediates thus was 79%.

*Example 4*

Triethyloxonium tetracloroaluminate, $(C_2H_5)_3OAlCl_4$, in the amount of 54 parts was added in small portions to a solution of the sodium salt of nitrocyclohexane prepared as in Example 1 and maintained during the addition at a temperature of 50–60° C. (1 to 1 oxonium salt to nitrocyclohexane mole ratio). When the addition was complete, the reaction mixture was held at the reaction temperature for an additional thirty minutes and then was worked up by the procedure of Example 1. The total conversion to amide intermediates was 18% (7% as cyclohexanone oxime and 11% as cyclohexanone oxime O-ethyl ether).

Example 5

A solution of the sodium salt of nitrocyclohexane was prepared in the following manner: 26 parts of nitrocyclohexane was dissolved in 200 parts of water containing 40 parts of sodium hydroxide. To the solution obtained, which was maintained at 50–65° C., was added in small portions 60 parts of triethyloxonium tetrachloroferrate (III), $(C_2H_5)_3OFeCl_4$ (1 to 1 oxonium salt to nitrocyclohexane mole ratio). The reaction mixture then was treated as in Example 1. Cyclohexanone oxime was obtained in the amount of 3.9 parts (17% conversion) and the O-ethyl ether of the oxime in the amount of 2.8 parts (10% conversion). The total conversion to amide-forming intermediate thus was 27%.

Example 6

Nitrocyclopentane in the amount of 23 parts was dissolved in 100 parts of water containing 8 parts of sodium hydroxide. Triethyloxonium fluoborate was then added portionwise in the amount of 40 parts to the sodium nitrocyclopentane solution which was maintained at 60–70° C. during the addition (1 to 1 oxonium salt to nitrocyclopentane mole ratio). After the addition had been completed, the reaction mixture was maintained at the reaction temperature for about one-half hour. When the mixture was worked up by the method described in Example 1, 17 parts of cyclopentanone oxime and 1.3 parts of cyclopentanone oxime O-ethyl ether were recovered. This corresponded to a 91% conversion to amide precursors.

Example 7

Eighteen parts of 2-nitropropane was dissolved in 100 parts of water containing 8 parts of sodium hydroxide. Triethyloxonium fluoborate was then added portionwise in the amount of 40 parts to the solution of the sodium salt of nitrocyclohexane, the reaction mixture being maintained at 60–70° C. throughout the addition and for an additional period of about thirty minutes following completion of the mixing of the reactants. When the reaction mixture was treated in the manner given in Example 1, acetoxime was recovered in the amount of 2.9 parts, a conversion of 20%.

The foregoing examples show that useful amide intermediates are obtained in good yield in the process of the present invention when a tertiary oxonium salt of the type $R_3OX$, wherein R is a lower alkyl radical and X is selected from the monovalent anions $BF_4$, $AlCl_4$, and $FeCl_4$, is added to an aqueous solution of an alkali metal salt of a secondary nitro alkane or of a nitro cycloalkane. The examples further show that the good yields of the amide intermediates are obtained with the use of essentially stoichiometrically equivalent quantities of the tertiary oxonium salt and the salt of the nitro compound. However, the use of greater than a stoichiometric equivalent of the oxonium salt in the present process is not deleterious to the yield of desired product.

The present process may be carried out at temperatures between about 20 and about 100° C. However, as the examples show, the use of temperatures between about 50 and about 70° C. gives the best yields of the desired amide intermediates and, hence, this range is to be preferred. Temperatures below about 20° C. generally are not considered desirable because external cooling and increased reaction times are required. The temperature range above 100° C. likewise is uneconomical because of excessive decomposition of the desired products.

The present process has been illustrated by the use of trimethyl- and triethyloxonium fluoborates, chloroaluminates, and chloroferrates. As is known, these tertiary oxonium salts may be produced by the methods outlined in the following:

1. 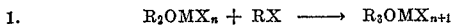
   $$R_2OMX_n + RX \longrightarrow R_3OMX_{n+1}$$

2. 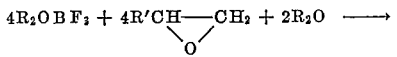

where:

R = alkyl
M = metal
X = halogen

The use of an epihalohydrin such as epichlorohydrin as the epoxide,

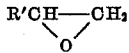

in the second method has the particular advantage that the by-product obtained can be converted by the following reactions to an epoxy ether, e. g., epiethylin, which is suitable for further preparations of the oxonium salts:

1. 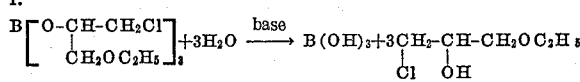

2. 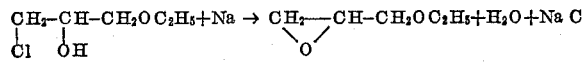

3. 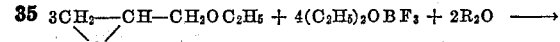

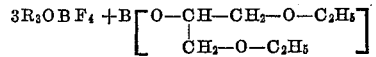

The tri-n-propyl homolog of the foregoing oxonium salts can also be used. Tertiary alkyl oxonium salts wherein the alkyl groups each contain more than three atoms of carbon are difficult to prepare, and no economic advantage would be gained from their use.

Among the oxonium salts used, the fluoborates may be preferred in that the alkali metal fluoborate obtained as by-product may be converted to a tertiary oxonium salt useful for further reactions according to the present process, e. g., by the method outlined in the following simplified reaction scheme:

1.
$$2NaBF_4 + H_2SO_4 + 3H_2O \longrightarrow BF_3\uparrow + 5HF + H_3BO_3 + Na_2SO_4$$

2. 
$$BF_3 + R_2O \longrightarrow R_2OBF_3$$

3. 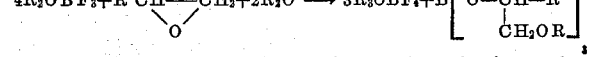

Similarly, although the sodium salts of nitrocyclohexane, nitrocyclopentane, and 2-nitropropane have been used as starting materials in the preceding examples, water-soluble salts, such as the potassium or ammonium salts, of other secondary nitro alkanes, nitro cycloalkanes, and substituted nitro compounds of these types can be used, e. g., salts of 2-nitrobutane, nitrocycloheptane, nitrocyclooctane, nitromethylcyclohexanes, and the like. Amide intermediates can also be produced according to the present process by employing water-soluble salts of primary nitro alkanes.

The process of the present invention, as illustrated by the examples, has been carried out batchwise. However, a continuous process is equally feasible, e. g., by continuously introducing an aqueous solution of an alkali metal salt of the nitro compound and the tertiary oxonium salt into a reaction zone at a rate such that essentially a stoichiometric equivalent of each reactant is maintained in the zone, maintaining the zone at a temperature between about 20 and about 100° C., and continuously withdrawing the product.

The foregoing examples additionally illustrate a method of recovering the amide intermediates prepared by the present process. For example, following the addition of the oxonium salt to the aqueous solution of the salt of the nitro compound, any crude amide intermediates present in the aqueous phase can be recovered by salting out, and the major portion of the intermediates can be recovered from the organic phase, e. g., by extraction. However, I do not intend that the present process be limited by any particular method of recovering the amide intermediates. In a continuous process, for instance, separation of the oil and water layers by mechanical means and recycling of the water layer to the reactor would be advantageous.

The products of the process of the present invention are important amide intermediates. For example, the cycloalkanone oximes and their O-alkyl ethers can be rearranged to lactams, the oxime and the corresponding O-alkyl ether being rearranged either separately or together, e. g., by the process taught in U. S. Patent 2,487,246, issued November 9, 1949. The acetoxime can be rearranged similarly to N-methylacetamide. However, the use of the products of the process of the present invention is not limited to the production of amides. The products are also useful as solvents, intermediates for chemical syntheses, and the like.

The present invention has been described in detail in the foregoing. However, it will be apparent to those skilled in the art that many modifications may be introduced without departure from the spirit and scope of the invention. Therefore, I intend to be limited only by the following claims.

I claim:

1. A process which comprises adding to an aqueous solution of an alkali metal salt of a nitro compound of the group consisting of secondary nitro alkanes and nitro cycloalkanes a tertiary oxonium salt of the type $R_3OX$, wherein R is a member of the group consisting of alkyl radicals containing 1 to 3 carbon atoms and X is selected from the monovalent anions $BF_4$, $AlCl_4$, and $FeCl_4$.

2. The process as claimed in claim 1, wherein the alkali metal salt of the nitro compound is an alkali metal salt of nitrocyclohexane.

3. The process as claimed in claim 1, wherein the alkali metal salt of the nitro compound is the sodium salt of nitrocyclohexane.

4. The process as claimed in claim 1, wherein the alkali metal salt of the nitro compound is an alkali metal salt of nitrocyclopentane.

5. The process as claimed in claim 1, wherein the alkali metal salt of the nitro compound is an alkali metal salt of 2-nitropropane.

6. A process which comprises adding to an aqueous solution of an alkali metal salt of a nitro compound of the group consisting of secondary nitro alkanes and nitro cycloalkanes a tertiary oxonium salt of the type $R_3OX$, wherein R is a member of the group consisting of alkyl radicals containing 1 to 3 carbon atoms and X is selected from the monovalent anions $BF_4$, $AlCl_4$, and $FeCl_4$, at a temperature between about 20 and about 100° C.

7. The process as claimed in claim 6, wherein the temperature during said addition is maintained between about 50 and about 70° C.

8. The process as claimed in claim 6, wherein the alkali metal salt of the nitro compound and the tertiary oxonium salt are used in substantially stoichiometrically equivalent quantities.

9. A process for the production of cyclohexanone oxime and a cyclohexanone oxime O-alkyl ether which comprises adding to an aqueous solution of an alkali metal salt of nitrocyclohexane a tertiary oxonium salt of the type $R_3OX$, wherein R is a member of the group consisting of alkyl radicals containing 1 to 3 carbon atoms and X is selected from the monovalent anions $BF_4$, $AlCl_4$, and $FeCl_4$, at a temperature between about 20 and about 100° C.

10. The process as claimed in claim 9, wherein the tertiary oxonium salt is trimethyloxonium fluoborate.

11. The process as claimed in claim 9, wherein the tertiary oxonium salt is triethyloxonium fluoborate.

12. A process for the production of cyclopentanone oxime and a cyclopentanone oxime O-alkyl ether which comprises adding to an aqueous solution of an alkali metal salt of nitrocyclopentane a tertiary oxonium salt of the type $R_3OX$, wherein R is a member of the group consisting of alkyl radicals containing 1 to 3 carbon atoms and X is selected from the monovalent anions $BF_4$, $AlCl_4$, and $FeCl_4$, at a temperature between about 20 and about 100° C.

No references cited.